United States Patent
Bong et al.

(10) Patent No.: US 8,484,309 B2
(45) Date of Patent: Jul. 9, 2013

(54) OWNER CONTROLLED ACCESS TO SHARED DATA RESOURCE

(75) Inventors: Paul Bong, Cary, NC (US); Jeffrey M. Eichen, Apex, NC (US); Jeffrey L. Fairbrother, Raleigh, NC (US); John W. Greiner, Raleigh, NC (US); Jerrold M. Heyman, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 853 days.

(21) Appl. No.: 11/676,525

(22) Filed: Feb. 20, 2007

(65) Prior Publication Data

US 2008/0201450 A1    Aug. 21, 2008

(51) Int. Cl.
*G06F 15/16* (2006.01)
*G06F 7/04* (2006.01)
*H04L 29/06* (2006.01)

(52) U.S. Cl.
USPC ........... 709/217; 709/218; 709/219; 713/164; 713/165; 713/166; 713/167; 726/27; 726/28; 726/29; 726/30

(58) Field of Classification Search
USPC .......... 709/223–225, 226, 217–219; 726/2–7, 726/26–33; 713/182, 183, 160, 161, 164–167; 707/694, 695, 705, 781–788
See application file for complete search history.

(56) References Cited

U.S. PATENT DOCUMENTS

| | | | |
|---|---|---|---|
| 5,495,533 A * | 2/1996 | Linehan et al. | 713/155 |
| 6,202,156 B1 * | 3/2001 | Kalajan | 726/11 |
| 6,389,420 B1 * | 5/2002 | Vahalia et al. | 707/8 |
| 6,457,130 B2 * | 9/2002 | Hitz et al. | 726/27 |
| 6,640,307 B2 * | 10/2003 | Viets et al. | 726/15 |
| 6,668,327 B1 * | 12/2003 | Prabandham et al. | 726/4 |
| 6,687,829 B1 * | 2/2004 | Miyamoto et al. | 726/7 |
| 6,823,338 B1 * | 11/2004 | Byrne et al. | 707/9 |
| 7,185,047 B1 * | 2/2007 | Bate et al. | 709/202 |
| 7,185,360 B1 * | 2/2007 | Anton et al. | 726/3 |
| 7,359,076 B2 * | 4/2008 | Uchino | 358/1.15 |
| 7,676,846 B2 * | 3/2010 | Robert et al. | 726/27 |
| 7,761,591 B2 * | 7/2010 | Graham | 709/233 |
| 7,995,756 B1 * | 8/2011 | McKinney et al. | 380/247 |
| 2001/0027472 A1 | 10/2001 | Guan | |
| 2002/0026511 A1 | 2/2002 | Garcia-Luna-Aceves et al. | |
| 2002/0065828 A1 | 5/2002 | Goodspeed | |
| 2002/0073058 A1 | 6/2002 | Kremer et al. | |
| 2002/0174369 A1 * | 11/2002 | Miyazaki et al. | 713/202 |
| 2002/0184398 A1 * | 12/2002 | Orenshteyn | 709/310 |
| 2002/0184535 A1 * | 12/2002 | Moaven et al. | 713/202 |
| 2003/0033528 A1 | 2/2003 | Ozog et al. | |
| 2003/0074208 A1 | 4/2003 | Bellantoni et al. | |
| 2004/0068563 A1 * | 4/2004 | Ahuja et al. | 709/225 |
| 2004/0143738 A1 * | 7/2004 | Savage et al. | 713/168 |

(Continued)

*Primary Examiner* — Asad Nawaz
*Assistant Examiner* — Kai Chang
(74) *Attorney, Agent, or Firm* — Lee Law, PLLC; Christopher B. Lee

(57) ABSTRACT

A method, system and computer program product for controlling an access to a data resource are disclosed. According to an embodiment, a method for controlling an access to a data resource comprises: communicating a request for the access to the data resource from a requester to an owner of the data resource for validation, the communicating being implemented by a network server; and generating information required by an access implementation server to implement a validated access and updating a data storage device with the generated information.

16 Claims, 3 Drawing Sheets

U.S. PATENT DOCUMENTS

| | | |
|---|---|---|
| 2004/0168066 A1 | 8/2004 | Alden |
| 2004/0199765 A1 | 10/2004 | Kohane et al. |
| 2004/0205132 A1 | 10/2004 | Czerwonka |
| 2005/0028006 A1 | 2/2005 | Leser et al. |
| 2005/0198330 A1* | 9/2005 | Kawabata et al. ............ 709/229 |
| 2005/0251531 A1* | 11/2005 | Jen et al. .................... 707/104.1 |
| 2006/0156388 A1* | 7/2006 | Stirbu et al. ....................... 726/4 |
| 2006/0173956 A1* | 8/2006 | Ulrich et al. .................. 709/203 |
| 2007/0016613 A1* | 1/2007 | Foresti et al. ............. 707/104.1 |
| 2007/0143398 A1* | 6/2007 | Graham ....................... 709/204 |

* cited by examiner

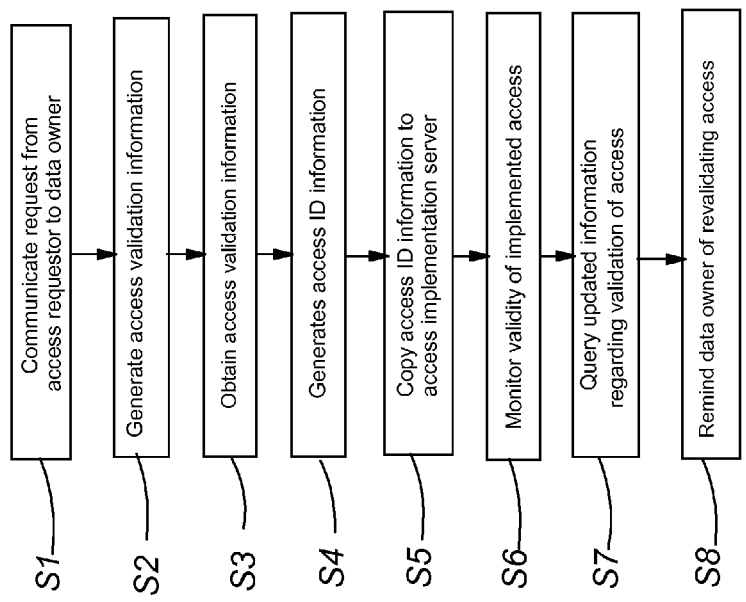

OWNER CONTROLLED ACCESS TO SHARED DATA RESOURCE

BACKGROUND OF THE DISCLOSURE

1. Technical Field

The disclosure relates generally to access control to data resources, and more particularly to owner controlled access to shared data resources.

2. Background Art

In a shared file system, controlling accesses to the data is necessary to create secured environments. Some existing file systems, such as the Andrew File System (AFS) and Distributed File System (DFS), have very sophisticated access control lists (ACL), but they cannot be managed efficiently. In addition, AFS or DFS file systems are additional costs to owners of existing infrastructures. The presently predominant shared file systems in use, i.e., Network File System (NFS) and Common Internet File System (CIFS), also known as Server Message Block (SMB), are widely used because they come with the respective operating systems without extra charge. The access control for NFS and CIFS requires manual intervention from a system administrator. In a large environment, the system administrator may need to request a notification from the data owner, wait for a response from the data owner, manually update the necessary ACL, i.e., /etc/netgroup for the NIS server and use a GUI to add a "userid" to the CIFS server, and then finally notify a user of the update for the user to access the data. Such an access control procedure is time consuming and labor intensive.

BRIEF SUMMARY OF THE INVENTION

A first aspect of the invention is directed to a method for controlling an access to a data resource, the method comprising: communicating a request for the access to the data resource from a requester to an owner of the data resource for validation, the communicating being implemented by a network server; and generating information required by an access implementation server to implement a validated access and updating a data storage device with the generated information.

A second aspect of the invention is directed to a system for controlling an access to a data resource, the system comprising: system for communicating a request for the access to the data resource from a requester to an owner of the data resource for validation, the communicating being implemented by a network server; and system for generating information required by an access implementation server to implement a validated access and updating a data storage device with the generated information.

A third aspect of the invention is directed to a computer program product for controlling an access to a data resource, the computer program product comprising: computer usable program code which, when executed by a computer system, enables the computer system to: communicate a request for the access to the data resource from a requestor to an owner of the data resource for validation using a network server in the computer system; and generate information required by an access implementation server to implement a validated access and update a data storage device with the generated information.

Other aspects and features of the present invention, as defined solely by the claims, will become apparent to those ordinarily skilled in the art upon review of the following non-limited detailed description of the invention in conjunction with the accompanying figures.

BRIEF DESCRIPTION OF THE SEVERAL VIEWS OF THE DRAWINGS

The embodiments of this disclosure will be described in detail, with reference to the following figures, wherein:

FIG. 3 shows an embodiment of an operation of an access control system.

It is noted that the drawings of the disclosure are not to scale. The drawings are intended to depict only typical aspects of the disclosure, and therefore should not be considered as limiting the scope of the invention. In the drawings, like numbering represents like elements among the drawings.

DETAILED DESCRIPTION OF THE DISCLOSURE

The following detailed description of embodiments refers to the accompanying drawings, which illustrate specific embodiments of the invention. Other embodiments having different structures and operations do not depart from the scope of the present invention.

1. System Overview

Figure 1:
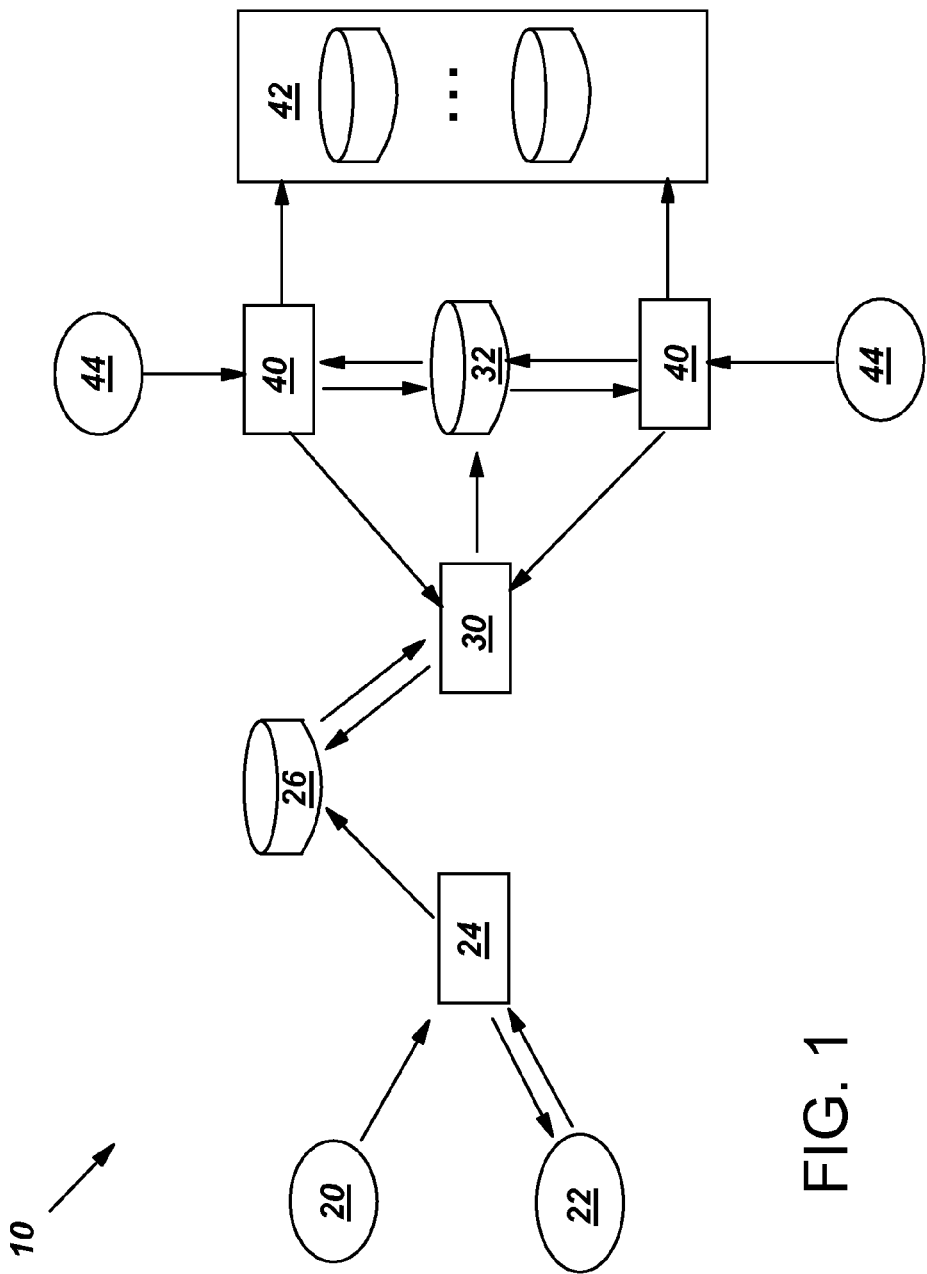
FIG. 1 shows a schematic view of a system according to an embodiment.

Referring to FIG. 1, a schematic view of an illustrative system 10 is shown. According to an embodiment, system 10 includes an access requester 20, a data owner 22, a network server 24, a network database 26, a database server 30, an access management database 32, at least one access implementing server 40, a shared data resource 42, and at least one client 44. A client 44 refers to a user machine used to implement an access to data resource 42 via an access implementation server 40. It should be appreciated that components of system 10 are differentiated among one another based only on the function(s) thereof for illustrative purposes. The division of system 10 into the above components does not limit the scope of the disclosure and does not indicate the physical separations/positions of any components thereof. The components of system 10 may be located in different physical positions or in the same physical location. For example, network database 26 and access management database 32 may be different storage units of the same data storage device. In addition, access requestor 20 and/or a user may use a client 44 to implement an access to data resource 42. Operation of system 10 and interactions of the components thereof as, e.g., represented by the arrows is described herein.

2. Computer Environment

Figure 2:
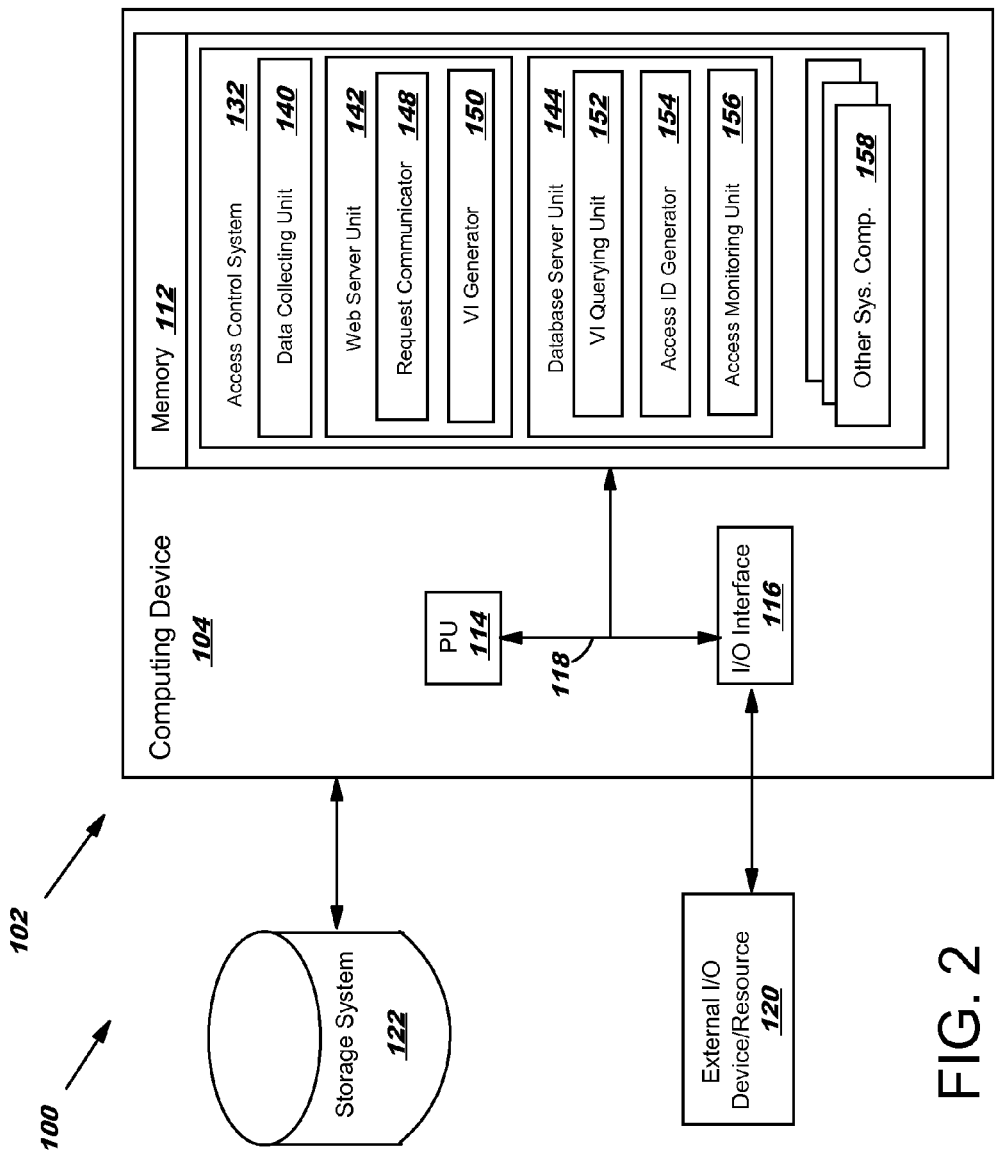
FIG. 2 shows a block diagram of an illustrative computing environment according to an embodiment.

FIG. 2 shows an illustrative environment 100 for controlling access to data resources. To this extent, environment 100 includes a computer infrastructure 102 that can perform the various processes described herein for controlling access to data resources 42 (FIG. 1). In particular, computer infrastructure 102 is shown including a computing device 104 that comprises an access control system 132, which enables computing device 104 to perform the process(es) described herein.

Computing device 104 is shown including a memory 112, a processor (PU) 114, an input/output (I/O) interface 116, and a bus 118. Further, computing device 104 is shown in communication with an external I/O device/resource 120 and a storage system 122. In general, processor 114 executes computer program code, such as access control system 132, that is stored in memory 112 and/or storage system 122. While executing computer program code, processor 114 can read and/or write data to/from memory 112, storage system 122, and/or I/O interface 116. Bus 118 provides a communications link between each of the components in computing device 104. I/O interface 116 can comprise any device that enables a user to interact with computing device 104 or any device that enables computing device 104 to communicate with one or more other computing devices. External I/O device/resource 120 can be coupled to the system either directly or through I/O interface 116.

In any event, computing device 104 can comprise any general purpose computing article of manufacture capable of executing computer program code installed thereon. However, it is understood that computing device 104 and access control system 132 are only representative of various possible equivalent computing devices that may perform the various processes of the disclosure. To this extent, in other embodiments, computing device 104 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively.

Similarly, computer infrastructure 102 is only illustrative of various types of computer infrastructures for implementing the invention. For example, in an embodiment, computer infrastructure 102 comprises two or more computing devices that communicate over any type of wired and/or wireless communications link, such as a network, a shared memory, or the like, to perform the various processes of the disclosure. When the communications link comprises a network, the network can comprise any combination of one or more types of networks (e.g., the Internet, a wide area network, a local area network, a virtual private network, etc.). Network adapters may also be coupled to the system to enable the data processing system to become coupled to other data processing systems or remote printers or storage devices through intervening private or public networks. Modems, cable modem and Ethernet cards are just a few of the currently available types of network adapters. Regardless, communications between the computing devices may utilize any combination of various types of transmission techniques.

Access control system 132 includes a data collecting unit 140; a web server unit 142; a database server unit 144; and other system components 158. Web server unit 142 includes a request communicator 148 and a validation information (VI) generator 150. Database server unit 144 includes a validation information (VI) querying unit 152, an access identification information (ID) generator 154, and an access monitoring unit 156. Other system components 158 may include any now known or later developed parts of access control system 132 not individually delineated herein, but understood by those skilled in the art.

As should be appreciated, components of computer infrastructure 102 and access control system 132 may be located in different physical locations. For example, referring to FIGS. 1-2, web server unit 142 may be used, with other components, to implement network server 24, while database server unit 144 may be used, with other components, to implement database server 30. In addition, memory 112 and/or storage system 122 may be used to implement/include network database 26 and access management database 32. The following description uses the above embodiment as an illustrative example.

Inputs/outputs to computer infrastructure 102, e.g., through external I/O device/resource 120 and/or I/O interface 116, may include information communicated between and among various components of system 10, as is described herein in detail. The operation of system 10 and access control system 132 are described together herein in detail.

3. Operation Methodology

An embodiment of the operation of access control system 132 is shown in the flow diagram of FIG. 3. Referring to FIGS. 1-3, in process S1, request communicator 148 of network server 24 communicates a request for an access to a data resource 42 by a user from access requester 20 to data owner 22 of the data resource 42 for validation. The communicating may be implemented by network server 24 automatically. According to an embodiment, the request needs to indicate a user and a specific type of access implementation server 40 used by the user for the requested access. Any method of communicating the request may be used and all are included in the disclosure. For example, access requester 20 may go to an interface provided by request communicator 148 and select a data resource 42 to be accessed by clicking a URL for that data resource 42. After access requester 20 clicks the URL, request communicator 148 may automatically generate a message to communicate the request to data owner 22 of the data resource 42 for validation. The message may include an URL for data owner 22 to select to validate or reject the requested access. In the current description, a data owner 22 includes a first individual having authority to validate the access and any second individual with a higher hierarchical level of authority than the first individual. As such, request communicator 148 may send messages to all the individuals that can validate the access, and any of them can validate the access. Alternatively, request communicator 148 may first send a message to an individual with a lower but sufficient authority. If request communicator 148 does not receive a reply from the individual within a set period, request communicator 148 may send another message to an individual with an authority of an immediately higher hierarchical level. According to an embodiment, the validation of access is only valid for a preset period (referred to as a 'granted period') and will expire thereafter. The period can be selected/determined by any method/in any manner.

In process S2, in response to data owner 22 validating the request for access, e.g., a validated access, validation information generator 150 of network server 24 generates access validation information and updates network database 26. The validation information may be of any content and in any format recognized within system 10. For example, the validation information may include information contained in the request for access and additional information, e.g., security information, provided by data owner 22 with respect to the validation. The validation information may also include a granted period for the access. In addition, validation information generator 150 may continually update network database 26 regarding the validation information. For example, within a granted period of access, data owner 22 may revoke or renew the validation of access, and validation information generator 150 may update network database 26 accordingly.

In process S3, validation information querying unit 152 of database server 30 obtains the access validation information for the validated access. The obtaining may be implemented by any method and all are included in the disclosure. For example, validation information querying unit 152 may query network database 26 periodically to obtain the updated validation information regarding the validated access.

In process S4, access identification information (ID) generator 154 generates access ID information required by an access implementation server 40 to implement the validated access. In addition, access ID generator 154 updates access management database 32 with the generated ID information. As is appreciated, different access implementation servers 40 require different ID information to enable a user to access data source 42 using a client 44. For example, access identification information (ID) generator 154 may update access management database 32 with generated /etc/netgroup file and smb.conf file for NIS servers and SAMBA servers, respectively. In addition, access identification information (ID) generator 154 may update access management database 32 with /etc/group file for all Unix servers.

For example, the smb.conf update may also require creating a new Unix account/smb account if this is the first time a user accesses data source 42, setting initial password, sending access requestor 20/a user a 'welcome' message, and adding the user to the appropriate 'valid user' entry for data resource 42 to be accessed. Additionally, a file may be created containing the userid, group, password, and new user creation action so that the process running on Windows/OS2 server can also update its internal database automatically, e.g., creating user and assigning password. If a user is already registered in a SAMBA server, then the userid is added to the appropriate 'valid users' entry for the data source 42 and a file may be created containing the userid, group, and the added access action so that the process running on the Windows/OS2 server can also update its internal database automatically.

For NFS users, access ID generator 154 generates and sends a 'welcome' message to access requester 20/a user. This message may contain the necessary information to modify the local/etc/group file in a client 44 such that the client 44 can be used to access data source 42. The necessary information includes group name, group number (GID), and a list of allowed userids. In addition, a root crontab entry is also required to be added to the client 44 to transfer the password file, i.e., /etc/password, and the group file, i.e., /etc/group, to database server 30, specifically, access monitoring unit 156 using, e.g., file transfer protocol (FTP). That is, database server 30 may obtain a duplicate of the identification information of the user and the client 44 selected by the user to implement the requested access to data resource 42.

In process S5, access management database 32 copies the generated access ID information to an access implementing server 40 used by a user for implementing the access. The copying may be achieved by any method and all are included. For example, an access implementation server 40, if used by a client 44 to implement the access, may query access management database 32 for the required access ID information. In the case that the access implementation server 40 obtains the required access ID information from access management database 32, which is consistent with the ID information provided by the user, the access implementation server 40 may enable the user to access data source 42 through a client 44.

In process S6, access monitoring unit 156 of database server 30 monitors the validity of an implemented access by checking identification information related to a user and a client 44 used for the implemented access, respectively, during the granted period of the requested access. The monitoring may be performed periodically during the granted period, e.g., every night. For example, a client 44 using a NFS type access implementation server 40 may need to send password file, i.e., /etc/password, and the group file, i.e., /etc/group, to access monitoring unit 156 of database server 30 such that those files will be checked with the duplicate identification information of a user and a client 44 obtained by database server 30 in process S4. The checking may be based on relevant authentication rules. If there is any conflict, all users on the specific client 44 will be notified of the problem and will be given a period of time to resolve the problem. If the problem is not resolved within the set period, access to data source 42 from the specific client 44 will be, e.g., revoked.

In process S7, validation information querying unit 152 queries network database 26 periodically during the granted period of access to obtain updated information regarding the validation of the access to determine whether the validation is maintained. For example, if data owner 22 revokes the validation of the access, validation information querying unit 152 may obtain the revocation information from network database 26 and access identification information (ID) generator 154 may change/delete the access ID information in data management database 32 such that a user can no longer obtain access to data resources 42.

In process S8, request communicator 148 reminds data owner 22 of a need to revalidate the access to data source 44. As mentioned above, an access validation may expire within a preset granted period of access. A data owner 22 must revalidate an access to data source 42 for a continued access after the period.

4. Conclusion

While shown and described herein as a method and system for controlling an access to a data resource, it is understood that the disclosure further provides various alternative embodiments. For example, in an embodiment, the invention provides a program product stored on a computer-readable medium, which when executed, enables a computer infrastructure to control an access to a data resource. To this extent, the computer-readable medium includes program code, such as access control system 132 (FIG. 2), which implements the process described herein. It is understood that the term "computer-readable medium" comprises one or more of any type of physical embodiment of the program code. In particular, the computer-readable medium can comprise program code embodied on one or more portable storage articles of manufacture (e.g., a compact disc, a magnetic disk, a tape, etc.), on one or more data storage portions of a computing device, such as memory 112 (FIG. 2) and/or storage system 122 (FIG. 2), and/or as a data signal traveling over a network (e.g., during a wired/wireless electronic distribution of the program product).

As used herein, it is understood that the terms "program code" and "computer program code" are synonymous and mean any expression, in any language, code or notation, of a set of instructions that cause a computing device having an information processing capability to perform a particular function either directly or after any combination of the following: (a) conversion to another language, code or notation; (b) reproduction in a different material form; and/or (c) decompression. To this extent, program code can be embodied as one or more types of program products, such as an application/software program, component software/a library of functions, an operating system, a basic I/O system/driver for a particular computing and/or I/O device, and the like. Further, it is understood that the terms "component" and "system" are synonymous as used herein and represent any combination of hardware and/or software capable of performing some function(s).

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A method, comprising:
   in response to an individual access request from an access requestor, comprising a user identification of the access requestor for which the individual access is requested and an identification of an access implementation server used by the access requestor for the requested individual access, to an owner of a data resource with access to the data resource controlled by an access management database, receiving from the owner of the data resource a validation of access authorizing the access requestor to access the data resource via the access implementation server;
   generating, via an access control computing device, access information required to implement a validated access by the access requestor via the access implementation server using a client machine selected by the access requestor in response to receiving the validation of access, where the access information comprises the identification of the access requestor and an identification of the selected client machine used by the access requestor to access the data resource; and
   updating, via the access control computing device, the access management database with the generated access information in response to generation of the access information.

2. The method of claim 1, further comprising copying the access information to the access implementation server used by the access requestor for the requested individual access to the data resource.

3. The method of claim 1, further comprising:
   monitoring access to the data resource; and
   revoking access to the data resource by the access requestor and the selected client machine if identification information provided by the access requestor and the selected client machine conflicts with the identification of the access requestor and the identification of the selected client machine of the access information.

4. The method of claim 1, where the owner of the data resource comprises a first entity having authority to generate the validation of access and a second entity having authority to generate the validation of access, the second entity having a higher level of authority than the first entity.

5. The method of claim 1, where the validation of access expires after a preset period, the method further comprising reminding the owner of the data resource of a need for revalidation.

6. The method of claim 5, further comprising changing the access information in response to the owner of the data resource changing the validation of access during the preset period.

7. A system, comprising:
   a memory; and
   a processor, programmed to:
      in response to an individual access request from an access requestor, comprising a user identification of the access requestor for which the individual access is requested and an identification of an access implementation server used by the access requestor for the requested individual access, to an owner of a data resource with access to the data resource controlled by an access management database, receive from the owner of the data resource a validation of access authorizing the access requestor to access the data resource via the access implementation server;
      generate access information required to implement a validated access by the access requestor via the access implementation server using a client machine selected by the access requestor in response to receiving the validation of access, where the access information comprises the identification of the access requestor and an identification of the selected client machine used by the access requestor to access the data resource; and
      update the access management database with the generated access information in response to generation of the access information.

8. The system of claim 7, where the processor is further programmed to copy the access information to the access implementation server used by the access requestor for the requested individual access to the data resource.

9. The system of claim 7, where the processor is further programmed to:
   monitor access to the data resource; and
   revoke access to the data resource by the access requestor and the selected client machine if identification information provided by the access requestor and the selected client machine conflicts with the identification of the access requestor and the identification of the selected client machine of the access information.

10. The system of claim 7, where the owner of the data resource comprises a first entity having authority to generate the validation of access and a second entity having authority to generate the validation of access, the second entity having a higher level of authority than the first entity.

11. The system of claim 7, where the validation of access expires after a preset period, and the processor is further programmed to remind the owner of the data resource of a need for revalidation.

12. The system of claim 11, where the processor is further programmed to change the access information in response to the owner of the data resource changing the validation of access during the preset period.

13. A computer program product comprising a computer readable storage device including computer usable program code which, when executed by a computer system, enables the computer system to:
   in response to an individual access request from an access requestor, comprising a user identification of the access requestor for which the individual access is requested and an identification of an access implementation server used by the access requestor for the requested individual access, to an owner of a data resource with access to the data resource controlled by an access management database, receive from the owner of the data resource a validation of access authorizing the access requestor to access the data resource via the access implementation server;
   generate access information required to implement a validated access by the access requestor via the access implementation server using a client machine selected by the access requestor in response to receiving the validation of access, where the access information comprises the identification of the access requestor and an identification of the selected client machine used by the access requestor to access the data resource; and
   update the access management database with the generated access information in response to generation of the access information.

14. The computer program product of claim 13, wherein the program code is further configured to:
   monitor access to the data resource; and
   revoke access to the data resource by the access requestor and the selected client machine if identification information provided by the access requestor and the selected client machine conflicts with the identification of the access requestor and the identification of the selected client machine of the access information.

15. The computer program product of claim 13, where the owner of the data resource comprises a first entity having authority to generate the validation of access and a second entity having authority to generate the validation of access, the second entity having a higher level of authority than the first entity.

16. The computer program product of claim 13, where the validation of access expires after a preset period, the program code being configured to remind the owner of the data resource of a need for revalidation.

* * * * *